(12) United States Patent
Wang et al.

(10) Patent No.: US 9,635,662 B2
(45) Date of Patent: *Apr. 25, 2017

(54) BLIND DECODING

(71) Applicant: Nokia Solutions and Networks Oy, Espoo (FI)

(72) Inventors: Xiao Yi Wang, Hoffman Estates, IL (US); Frank Frederiksen, Klarup (DK)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/598,362

(22) Filed: Jan. 16, 2015

(65) Prior Publication Data

US 2015/0124770 A1    May 7, 2015

Related U.S. Application Data

(63) Continuation of application No. 13/792,430, filed on Mar. 11, 2013, now Pat. No. 9,042,325, which is a continuation of application No. PCT/EP2012/054669, filed on Mar. 16, 2012.

(51) Int. Cl.
*H04W 72/04* (2009.01)
*H04W 76/00* (2009.01)
*H04L 5/00* (2006.01)

(52) U.S. Cl.
CPC ........... *H04W 72/042* (2013.01); *H04L 5/001* (2013.01); *H04L 5/006* (2013.01); *H04L 5/0051* (2013.01); *H04L 5/0053* (2013.01); *H04L 5/0064* (2013.01); *H04L 5/0098* (2013.01); *H04W 72/04* (2013.01); *H04W 76/00* (2013.01); *H04L 5/0023* (2013.01)

(58) Field of Classification Search
CPC ..... H04W 72/04; H04W 88/08; H04W 76/00; H04W 84/08; H04W 76/02; H04L 5/003; H04L 5/0046; H04L 5/0058; H04L 29/06163; H04L 1/0001; H04J 3/16; H04J 3/1682; H04J 3/1694; H04J 9/00
USPC .......................... 370/437, 464–465, 310–350
See application file for complete search history.

(56) References Cited

U.S. PATENT DOCUMENTS

| | | | | |
|---|---|---|---|---|
| 8,606,286 | B2 * | 12/2013 | Vrzic | H04L 1/0046 370/329 |
| 2010/0177700 | A1 * | 7/2010 | Luo | H04B 7/0689 370/328 |
| 2010/0279628 | A1 | 11/2010 | Love et al. | 455/70 |
| 2011/0075624 | A1 | 3/2011 | Cho et al. | |
| 2011/0103509 | A1 * | 5/2011 | Chen | H04L 5/0007 375/295 |
| 2011/0110316 | A1 | 5/2011 | Chen et al. | 370/329 |
| 2011/0205978 | A1 | 8/2011 | Nory et al. | 370/329 |
| 2012/0033627 | A1 * | 2/2012 | Li | H04L 5/0007 370/329 |
| 2012/0054258 | A1 | 3/2012 | Li et al. | |
| 2012/0099536 | A1 * | 4/2012 | Lee | H04L 5/005 370/328 |
| 2012/0195267 | A1 * | 8/2012 | Dai | H04L 1/0072 370/329 |
| 2013/0016655 | A1 | 1/2013 | Heo et al. | 370/328 |
| 2013/0100833 | A1 | 4/2013 | Xu et al. | 370/252 |
| 2013/0142142 | A1 | 6/2013 | McBeath et al. | 370/329 |
| 2013/0163551 | A1 | 6/2013 | He et al. | 370/329 |
| 2013/0183987 | A1 | 7/2013 | Vrzic et al. | 455/450 |
| 2013/0250879 | A1 * | 9/2013 | Ng | H04W 72/042 370/329 |
| 2013/0250880 | A1 * | 9/2013 | Liao | H04W 72/042 370/329 |
| 2013/0252606 | A1 * | 9/2013 | Nimbalker | H04B 17/309 455/434 |
| 2013/0308572 | A1 * | 11/2013 | Sayana | H04W 72/048 370/329 |
| 2014/0044070 | A1 | 2/2014 | Chen et al. | 370/329 |
| 2014/0086184 | A1 * | 3/2014 | Guan | H04W 72/1289 370/329 |
| 2014/0133427 | A1 * | 5/2014 | Kim | H04L 5/0053 370/329 |
| 2014/0140306 | A1 | 5/2014 | Malladi et al. | 370/329 |
| 2015/0117353 | A1 * | 4/2015 | Takeda | H04W 72/042 370/329 |
| 2015/0257150 | A1 * | 9/2015 | Yi | H04B 7/26 370/329 |

FOREIGN PATENT DOCUMENTS

| | | |
|---|---|---|
| JP | 2011/519205 A | 6/2011 |
| WO | WO-2011/053851 A2 | 5/2011 |
| WO | WO-2011/084026 A2 | 7/2011 |
| WO | WO 2012/011239 A1 | 1/2012 |
| WO | WO-2013/109501 A1 | 7/2013 |

OTHER PUBLICATIONS

3GPP TS 36.212 V10.2.0; 3rd Generation Partnership Project; Technical Specification Group Radio Access Network; Evolved Universal Terrestrial Radio Access (E-UTRA); Multiplexing and channel coding (Release 10); Jun. 2011; Section 5.3.3, pp. 55-74.

(Continued)

*Primary Examiner* — Warner Wong
(74) *Attorney, Agent, or Firm* — Harrington & Smith (57) ABSTRACT

A method includes selecting, in a system in which a communication device searches for unscheduled transmissions of downlink control information for said communication device, a combination of search spaces for unscheduled transmissions of downlink control information for a communication device by a number of transmission techniques. The method includes transmitting an indication of the result of the selected combination to said communication device. Apparatus and program products are also disclosed.

18 Claims, 5 Drawing Sheets

(56) References Cited

OTHER PUBLICATIONS

3GPP TS 36.211 V10.4.0; $3^{rd}$ Generation Partnership Project; Technical Specification Group Radio Access Network; Evolved Universal Terrestrial Radio Access (E-UTRA); Physical Channels and Modulation (Release 10); Dec. 2011; Section 6.10.1, pp. 73-76.

3GPP TS 36.213 V10.4.0; $3^{rd}$ Generation Partnership Project; Technical Specification Group Radio Access Network; Evolved Universal Terrestrial Radio Access (E-UTRA); Physical layer procedures (Release 10); Dec. 2011; Section 9.1.1, pp. 91-93.

3GPP TS 36.211 V10.1.0 (Mar. 2011); 3rd Generation Partnership Project; Technical Specification Group Radio Access Network; Evolved Universal Terrestrial Radio Access (E-UTRA); Physical Channels and Modulation (Release 10).

\* cited by examiner

BLIND DECODING

CROSS-REFERENCE TO RELATED APPLICATIONS

The present application is a continuation of, and claims the benefit under 35 U.S.C. §365(c), of PCT application PCT/EP2012/054669, filed on Mar. 16, 2012, the disclosure of which is hereby incorporated by reference in its entirety.

TECHNICAL FIELD

This invention relates generally to wireless networks and, more specifically, relates to downlink control information in wireless networks.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Radio communication systems typically involve the transmission of downlink control information via radio resources whose precise identity is not known to the intended recipient(s) of the downlink control information. A receiving device finds downlink control information intended for it by repeatedly selecting different candidate sets of radio resources and attempting to successfully decode the signals carried on said sets of radio resources. This is known as blind decoding.

It has been proposed to make such unscheduled transmissions of downlink control information according to an enhanced transmission technique by which gains, such as frequency-domain packet scheduling (FDPS) gain, can be targeted; whilst continuing to also make unscheduled transmissions according to the conventional transmission technique.

There has been identified the challenge of reducing the processing power required by a communication device to perform blind decoding under the above-mentioned proposal.

SUMMARY

This section contains examples of possible implementations and is not meant to be limiting.

There is hereby provided a method, comprising: in a system in which a communication device searches for unscheduled transmissions of downlink control information for said communication device: selecting a combination of search spaces for unscheduled transmissions of downlink control information for a communication device by a plurality of transmission techniques: and transmitting an indication of the result of the selected combination to said communication device.

According to one embodiment, the method further comprises deciding how much search space to assign to unscheduled transmissions of downlink control information for said communication device by one or more of said plurality of transmission techniques relative to unscheduled transmissions of downlink control information for said communication device by one or more others of said plurality of transmission techniques.

According to one embodiment, said selecting comprises selecting a predefined combination from a plurality of predefined combinations.

According to one embodiment, said plurality of predefined combinations includes a predefined combination according to which no search space is assigned to unscheduled transmissions of downlink control information by one of said plurality of transmission techniques.

According to one embodiment, a plurality of aggregation levels are used for the transmission of downlink control information, and a respective search space is predefined for each aggregation level for each transmission technique; and the method further comprises: selecting a respective set of one or more aggregation levels for each of said plurality of transmission techniques; and transmitting an indication of the selected respective sets of aggregation levels to said communication device.

According to one embodiment, said selecting is performed at least partly on the basis of one or more of: (a) the size of the load on the cell in which the transmissions are made, and (b) channel state information for the wireless interface with the communication device.

There is also hereby provided a method, comprising: in a system in which a communication device searches for unscheduled transmissions of downlink control information messages for said communication device according to a plurality of message formats: selecting a respective set of one or more search spaces for each of said plurality of message formats; and transmitting to said communication device an indication of the result of said selection of respective sets of one or more search spaces.

According to one embodiment, a plurality of aggregation levels are used for the transmission of downlink control messages, and a respective search space is predefined for each aggregation level; and the method further comprises: selecting a respective set of one or more aggregation levels for each of said plurality of message formats; and transmitting an indication of the selected respective sets of aggregation levels to said communication device.

According to one embodiment, the plurality of message formats includes first and second message formats providing control information for a transmission according to respective first and second transmission modes; and the selecting takes into account an indication of the respective transmission error probability for the first and second transmission modes.

There is also hereby provided a method, comprising: in a system in which a radio access network transmits indications of the results of selections of combinations of search spaces for unscheduled transmissions by a plurality of transmission techniques of downlink control information for one or more communication devices: searching at a first communication device for unscheduled transmissions of downlink control information for said communication device; wherein said searching is performed either: (a) on the basis of a transmitted indication of the result of a selection for said first communication device of a combination of search spaces for unscheduled transmissions by said plurality of transmission techniques of downlink control information; or (b) in the absence of a transmitted indication of the result of a selection for said first communication device of a combination of search spaces for unscheduled transmissions by said plurality of transmission techniques of downlink control information, on the basis of a default combination of search spaces for unscheduled transmissions by said plurality of transmission techniques of downlink control information for said first communication device.

There is also hereby provided a method comprising: searching at a first communication device for unscheduled transmissions of downlink control information for said communication device by a plurality of transmission techniques; wherein said searching is performed on the basis of a transmitted indication of the result of a selection of a combination of search spaces for unscheduled transmissions of downlink control information for said first communication device by said plurality of transmission techniques.

According to one embodiment, said transmitted indication indicates how much search space has been assigned to unscheduled transmissions of downlink control information for said first communication device by one or more of said plurality of transmission techniques relative to unscheduled transmissions of downlink control information for said first communication device by one or more others of said plurality of transmission techniques.

According to one embodiment, said transmitted indication identifies one of a plurality of predefined combinations.

According to one embodiment, said plurality of predefined combinations includes a predefined combination according to which no search space is assigned to unscheduled transmissions of downlink control information by one of said plurality of transmission techniques.

According to one embodiment, a plurality of aggregation levels are used for the transmission of downlink control information, and a respective search space is predefined for each aggregation level for each transmission technique; and said transmitted indication identifies a respective set of one or more aggregation levels for each of said plurality of transmission techniques.

There is also hereby provided a method, comprising: in a system in which a radio access network transmits unscheduled transmissions of downlink control information messages for a plurality of communication devices according to a plurality of message formats, and in which said radio access network transmits indications of the results of selections for one or more communication devices of respective sets of one or more search spaces for each of said plurality of message formats: searching at a first communication device for unscheduled transmissions of downlink control information for said first communication device; wherein said searching is performed either: (a) on the basis of a transmitted indication of the result of a selection for said first communication device of a respective set of one or more search spaces for each of said plurality of message formats; or (b) in the absence of a transmitted indication of the result of a selection for said first communication device of a respective set of one or more search spaces for each of said plurality of message formats, on the basis of a respective default set of one or more search spaces for each of said plurality of message formats.

There is also hereby provided a method, comprising: searching at a first communication device for unscheduled transmissions of downlink control information messages for said first communication device according to a plurality of message formats: wherein said searching is performed based on a transmitted indication of the result of a selection of a respective set of one or more search spaces for each of said plurality of message formats.

According to one embodiment, a plurality of aggregation levels are used for the transmission of downlink control messages, and a respective search space is predefined for each aggregation level; and wherein the transmitted indication identifies a respective selected set of one or more aggregation levels for each of said plurality of message formats.

There is also hereby provided an apparatus comprising: a processor and memory including computer program code, wherein the memory and computer program code are configured to, with the processor, cause the apparatus to: in a system in which a communication device searches for unscheduled transmissions of downlink control information for said communication device: select a combination of search spaces for unscheduled transmissions of downlink control information for a communication device by a plurality of transmission techniques: and transmitting an indication of the result of the selected combination to said communication device.

According to one embodiment, the memory and computer program code are further configured to, with the processor, cause the apparatus to: decide how much search space to assign to unscheduled transmissions of downlink control information for said communication device by one or more of said plurality of transmission techniques relative to unscheduled transmissions of downlink control information for said communication device by one or more others of said plurality of transmission techniques.

According to one embodiment, the memory and computer program code are further configured to, with the processor, cause the apparatus to: select a predefined combination from a plurality of predefined combinations.

According to one embodiment, said plurality of predefined combinations includes a predefined combination according to which no search space is assigned to unscheduled transmissions of downlink control information by one of said plurality of transmission techniques.

According to one embodiment, a plurality of aggregation levels are used for the transmission of downlink control information, and a respective search space is predefined for each aggregation level for each transmission technique; and wherein the memory and computer program code are further configured to, with the processor, cause the apparatus to: select a respective set of one or more aggregation levels for each of said plurality of transmission techniques; and transmitting an indication of the selected respective sets of aggregation levels to said communication device.

According to one embodiment, the memory and computer program code are further configured to, with the processor, cause the apparatus to: perform said selection at least partly on the basis of one or more of: (a) the size of the load on the cell in which the transmissions are made, and (b) channel state information for the wireless interface with the communication device.

There is also hereby provided an apparatus comprising: a processor and memory including computer program code, wherein the memory and computer program code are configured to, with the processor, cause the apparatus to: in a system in which a communication device searches for unscheduled transmissions of downlink control information messages for said communication device according to a plurality of message formats: select a respective set of one or more search spaces for each of said plurality of message formats; and transmitting to said communication device an indication of the result of said selection of respective sets of one or more search spaces.

According to one embodiment, a plurality of aggregation levels are used for the transmission of downlink control messages, and a respective search space is predefined for each aggregation level; and wherein the memory and computer program code are further configured to, with the processor, cause the apparatus to: select a respective set of one or more aggregation levels for each of said plurality of message formats; and transmit an indication of the selected respective sets of aggregation levels to said communication device.

According to one embodiment, the plurality of message formats includes first and second message formats providing control information for a transmission according to respective first and second transmission modes; and wherein the memory and computer program code are further configured to, with the processor, cause the apparatus to: perform said selection taking into account an indication of the respective transmission error probability for the first and second transmission modes.

There is also hereby provided an apparatus comprising: a processor and memory including computer program code, wherein the memory and computer program code are configured to, with the processor, cause the apparatus to: in a system in which a radio access network transmits indications of the results of selections of combinations of search spaces for unscheduled transmissions by a plurality of transmission techniques of downlink control information for one or more communication devices: search at a first communication device for unscheduled transmissions of downlink control information for said communication device; wherein said searching is performed either: (a) on the basis of a transmitted indication of the result of a selection for said first communication device of a combination of search spaces for unscheduled transmissions by said plurality of transmission techniques of downlink control information; or (b) in the absence of a transmitted indication of the result of a selection for said first communication device of a combination of search spaces for unscheduled transmissions by said plurality of transmission techniques of downlink control information, on the basis of a default combination of search spaces for unscheduled transmissions by said plurality of transmission techniques of downlink control information for said first communication device.

There is also hereby provided an apparatus comprising: a processor and memory including computer program code, wherein the memory and computer program code are configured to, with the processor, cause the apparatus to: search at a first communication device for unscheduled transmissions of downlink control information for said communication device by a plurality of transmission techniques; wherein said searching is performed on the basis of a transmitted indication of the result of a selection of a combination of search spaces for unscheduled transmissions of downlink control information for said first communication device by said plurality of transmission techniques.

According to one embodiment, said transmitted indication indicates how much search space has been assigned to unscheduled transmissions of downlink control information for said first communication device by one or more of said plurality of transmission techniques relative to unscheduled transmissions of downlink control information for said first communication device by one or more others of said plurality of transmission techniques.

According to one embodiment, said transmitted indication identifies one of a plurality of predefined combinations.

According to one embodiment, said plurality of predefined combinations includes a predefined combination according to which no search space is assigned to unscheduled transmissions of downlink control information by one of said plurality of transmission techniques.

According to one embodiment, a plurality of aggregation levels are used for the transmission of downlink control information, and a respective search space is predefined for each aggregation level for each transmission technique; and said transmitted indication identifies a respective set of one or more aggregation levels for each of said plurality of transmission techniques.

There is also hereby provided an apparatus comprising: a processor and memory including computer program code, wherein the memory and computer program code are configured to, with the processor, cause the apparatus to: in a system in which a radio access network transmits unscheduled transmissions of downlink control information messages for a plurality of communication devices according to a plurality of message formats, and in which said radio access network transmits indications of the results of selections for one or more communication devices of respective sets of one or more search spaces for each of said plurality of message formats: search at a first communication device for unscheduled transmissions of downlink control information for said first communication device; wherein said searching is performed either: (a) on the basis of a transmitted indication of the result of a selection for said first communication device of a respective set of one or more search spaces for each of said plurality of message formats; or (b) in the absence of a transmitted indication of the result of a selection for said first communication device of a respective set of one or more search spaces for each of said plurality of message formats, on the basis of a respective default set of one or more search spaces for each of said plurality of message formats.

There is also hereby provided an apparatus comprising: a processor and memory including computer program code, wherein the memory and computer program code are configured to, with the processor, cause the apparatus to: search at a first communication device for unscheduled transmissions of downlink control information messages for said first communication device according to a plurality of message formats: wherein said searching is performed based on a transmitted indication of the result of a selection of a respective set of one or more search spaces for each of said plurality of message formats.

According to one embodiment, a plurality of aggregation levels are used for the transmission of downlink control messages, and a respective search space is predefined for each aggregation level; and wherein the transmitted indication identifies a respective selected set of one or more aggregation levels for each of said plurality of message formats.

There is also hereby provided a computer program product comprising program code means which when loaded into a computer controls the computer to: in a system in which a communication device searches for unscheduled transmissions of downlink control information for said communication device: select a combination of search spaces for unscheduled transmissions of downlink control information for a communication device by a plurality of transmission techniques: and transmitting an indication of the result of the selected combination to said communication device.

There is also hereby provided a computer program product comprising program code means which when loaded into a computer controls the computer to: in a system in which a communication device searches for unscheduled transmissions of downlink control information messages for said communication device according to a plurality of message formats: select a respective set of one or more search spaces for each of said plurality of message formats; and transmitting to said communication device an indication of the result of said selection of respective sets of one or more search spaces.

There is also hereby provided a computer program product comprising program code means which when loaded into a computer controls the computer to: in a system in which a radio access network transmits indications of the results of selections of combinations of search spaces for unscheduled transmissions by a plurality of transmission techniques of downlink control information for one or more communication devices: search at a first communication device for unscheduled transmissions of downlink control information for said communication device; wherein said searching is performed either: (a) on the basis of a transmitted indication of the result of a selection for said first communication device of a combination of search spaces for unscheduled transmissions by said plurality of transmission techniques of downlink control information; or (b) in the absence of a transmitted indication of the result of a selection for said first communication device of a combination of search spaces for unscheduled transmissions by said plurality of transmission techniques of downlink control information, on the basis of a default combination of search spaces for unscheduled transmissions by said plurality of transmission techniques of downlink control information for said first communication device.

There is also hereby provided a computer program product comprising program code means which when loaded into a computer controls the computer to: search at a first communication device for unscheduled transmissions of downlink control information for said communication device by a plurality of transmission techniques; wherein said searching is performed on the basis of a transmitted indication of the result of a selection of a combination of search spaces for unscheduled transmissions of downlink control information for said first communication device by said plurality of transmission techniques.

There is also hereby provided a computer program product comprising program code means which when loaded into a computer controls the computer to: in a system in which a radio access network transmits unscheduled transmissions of downlink control information messages for a plurality of communication devices according to a plurality of message formats, and in which said radio access network transmits indications of the results of selections for one or more communication devices of respective sets of one or more search spaces for each of said plurality of message formats: search at a first communication device for unscheduled transmissions of downlink control information for said first communication device; wherein said searching is performed either: (a) on the basis of a transmitted indication of the result of a selection for said first communication device of a respective set of one or more search spaces for each of said plurality of message formats; or (b) in the absence of a transmitted indication of the result of a selection for said first communication device of a respective set of one or more search spaces for each of said plurality of message formats, on the basis of a respective default set of one or more search spaces for each of said plurality of message formats.

There is also hereby provided a computer program product comprising program code means which when loaded into a computer controls the computer to: search at a first communication device for unscheduled transmissions of downlink control information messages for said first communication device according to a plurality of message formats: wherein said searching is performed based on a transmitted indication of the result of a selection of a respective set of one or more search spaces for each of said plurality of message formats.

According to one embodiment, said plurality of transmission techniques include: a first transmission technique involving the transmission of one or more reference signals specific to said communication device; and a second transmission technique that does not involve transmission of one or more reference signals specific to said communication device.

According to one embodiment, said plurality of transmission techniques include: a first transmission technique involving the transmission of both one or more reference signals specific to said communication device and one or more channel-state-information reference signals; and a second transmission technique involving transmission of one or more cell-specific reference signals.

According to one embodiment, said plurality of transmission techniques include: a first transmission technique involving the precoding and transmission of demodulation reference signals together with the precoding and transmission of data symbols defining downlink control information, and the transmission of one or more channel state information reference signals together with the transmission of precoded data symbols defining downlink control information; and a second transmission technique that involves transmission of cell-specific reference signals together with transmission of precoded data symbols defining downlink control information.

BRIEF DESCRIPTION OF THE DRAWINGS

Embodiments of the present invention are described in detail hereunder, by way of example only, with reference to the accompanying drawings, in which.

DETAILED DESCRIPTION OF THE DRAWINGS

Embodiments of the invention are described in detail below, by way of example only, in the context of a cellular network operating in accordance with an E-UTRAN standard.

Figure 1:
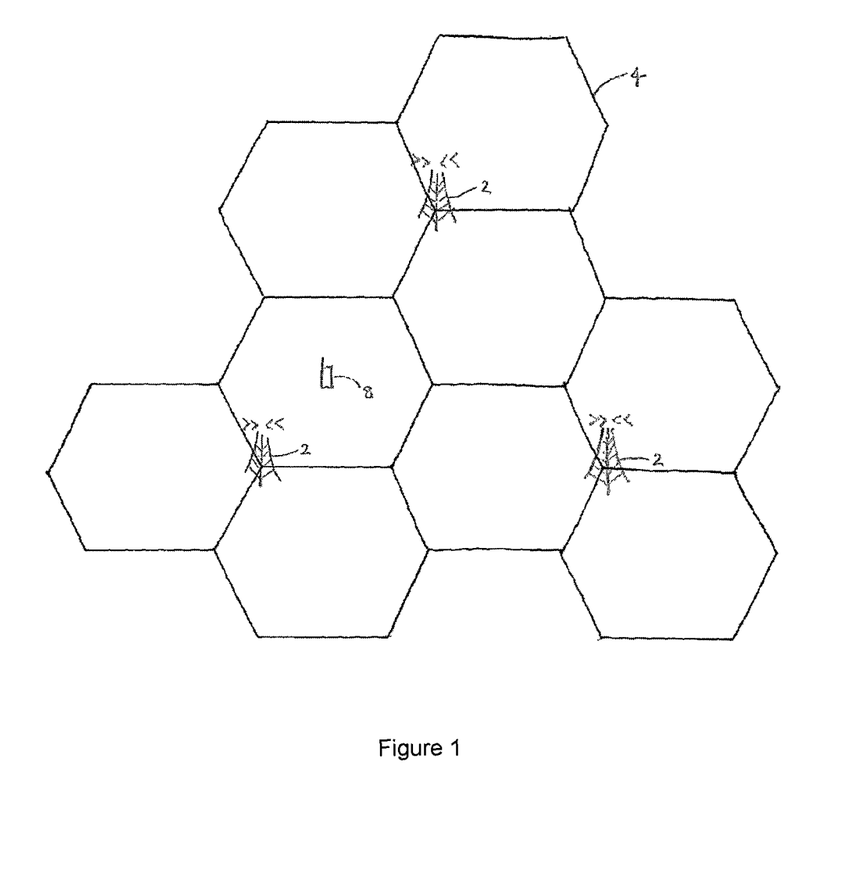
FIG. 1 illustrates an example of a cellular network in which embodiments of the present invention are implemented.

FIG. 1 illustrates an example of a cellular network in which embodiments of the present invention can be implemented. The cellular network includes cells 4 with transceivers at respective eNodeBs (eNBs). Only nine cells are shown in FIG. 1, but a mobile telecommunication network will typically comprise tens of thousands of cells. Each eNB 2 is connected by a wired link to a core network (not shown).

Figure 2:
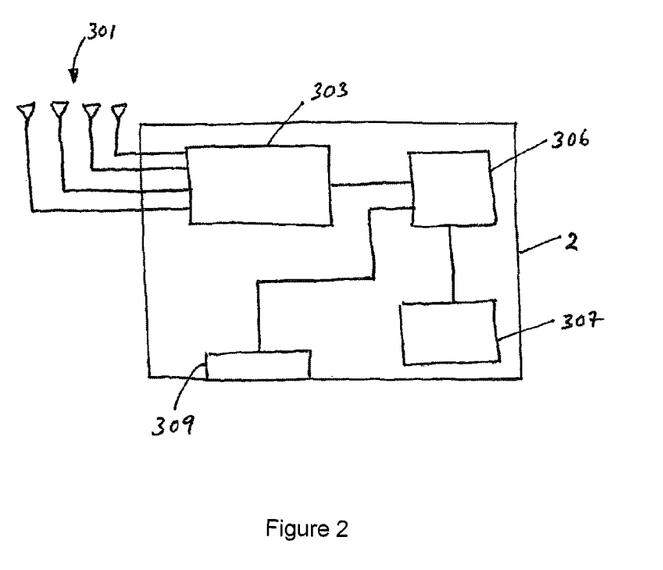
FIG. 2 illustrates an example of apparatus for use at user equipment in FIG. 1.

FIG. 2 shows a schematic view of an example of user equipment 8 that may be used for communicating with the eNBs 2 of FIG. 1 via a wireless interface. The user equipment (UE) 8 may be used for various tasks such as making and receiving phone calls, for receiving and sending data from and to a data network and for experiencing, for example, multimedia or other content.

The UE 8 may be any device capable of at least sending or receiving radio signals to or from the eNBs 2 of FIG. 1. Non-limiting examples include a mobile station (MS), a portable computer provided with a wireless interface card or other wireless interface facility, personal data assistant (PDA) provided with wireless communication capabilities, or any combinations of these or the like. The UE 8 may communicate via an appropriate radio interface arrangement of the UE 8. The interface arrangement may be provided for example by means of a radio part and associated antenna arrangement. The antenna arrangement may be arranged internally or externally to the UE 8.

The UE 8 may be provided with at least one data processing entity 203 and at least one memory or data storage entity 217 for use in tasks it is designed to perform. The data processor 213 and memory 217 may be provided on an appropriate circuit board 219 and/or in chipsets.

The user may control the operation of the UE 8 by means of a suitable user interface such as key pad 201, voice commands, touch sensitive screen or pad, combinations thereof or the like. A display 215, a speaker and a microphone may also be provided. Furthermore, the UE 8 may comprise appropriate connectors (either wired or wireless) to other devices and/or for connecting external accessories, for example hands-free equipment, thereto.

Figure 3:
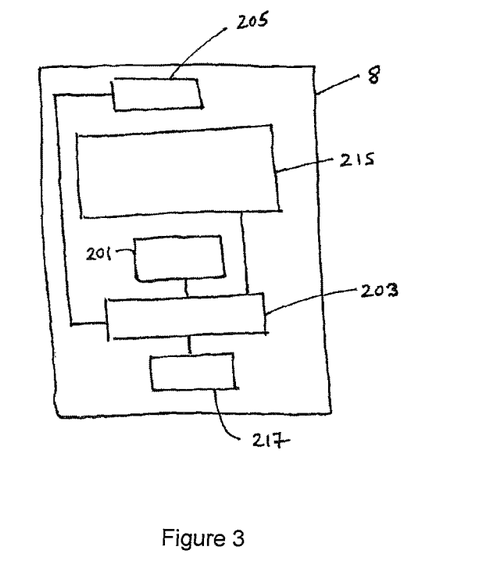
FIG. 3 illustrates an example of apparatus for use at eNodeB in FIG. 1.

FIG. 3 shows an example of apparatus for use at the eNBs 2 of FIG. 1 and for serving the cell 4 in which UE 8 is located. The apparatus comprises a radio frequency antenna array 301 configured to receive and transmit radio frequency signals; radio frequency interface circuitry 303 configured to interface the radio frequency signals received and transmitted by the antenna 301 and the data processor 306. The radio frequency interface circuitry 303 may also be known as a transceiver. The apparatus also comprises an interface 309 via which it can send and receive information to and from one or more other network nodes. The data processor 306 is configured to process signals from the radio frequency interface circuitry 303, control the radio frequency interface circuitry 303 to generate suitable RF signals to communicate information to the UE 6 via the wireless communications link, and also to exchange information with other network nodes via the interface 309. The memory 307 is used for storing data, parameters and instructions for use by the data processor 306.

It would be appreciated that the apparatus shown in each of FIGS. 2 and 3 described above may comprise further elements which are not directly involved with the embodiments of the invention described hereafter.

As indicated at 3GPP TS 36.212 Section 5.3.3, downlink control information (DCI) can comprise one or more of downlink or uplink scheduling information, requests for aperiodic CQI (channel quality information) reports, notifications of MCCH (multicast control channel) change and uplink power control commands.

Different message formats are used depending on the purpose of the downlink control information.

For example, the format identified at 3GPP TS 36.212 Section 5.3.3.1.2 as DCI Format 1 is used for communicating resource assignments for single codeword PDSCH transmissions; and the format identified at 3GPP TS 36.212 Section 5.3.3.1.3 as DCI Format 2 is used for communicating resource assignments for PDSCH for closed loop MIMO operation.

eNB 2 determines a PDCCH format to be transmitted to UE 8, and creates a set of information bits according to the rules set out at 3GPP TS 36.212 Section 5.3.3. The PDCCH formats differ according to the number of control channel elements (CCEs) used for the transmission of the DCI message, which number is referred to as the aggregation level, L. For example, the aggregation level could be 1, 2, 4 or 8.

The information bits comprising one downlink control information (DCI) message are then subjected to the attachment of a CRC (cyclic redundancy check). The CRC is masked with an RNTI (radio network temporary identifier) either associated with the UE 8 for which the DCI message is intended, or with an RNTI associated with the usage of the PDCCH in the case of a PDCCH intended for multiple recipients.

The resulting set of bits are then subjected to channel coding and rate matching, as described at 3GPP TS 36.212 Section 5.3.3.

As described at 3GPP TS 36.211 Section 6.3, the resulting set of coded bits are transformed into a baseband signal by the following steps: (i) scrambling of coded bits; (ii) modulation of scrambled bits to generate complex-valued modulation symbols; (iii) mapping of the complex-valued modulation symbols onto one or several transmission layers; (iv) precoding of the complex-valued modulation symbols on each layer for transmission on the antenna ports; (v) mapping of complex-valued modulation symbols for each antenna port to resource elements; and (vi) generation of complex-valued time-domain OFDM signal for each antenna port.

The eNB 2 transmits DCI messages for UE 8 according to two different transmission techniques.

Figure 4:
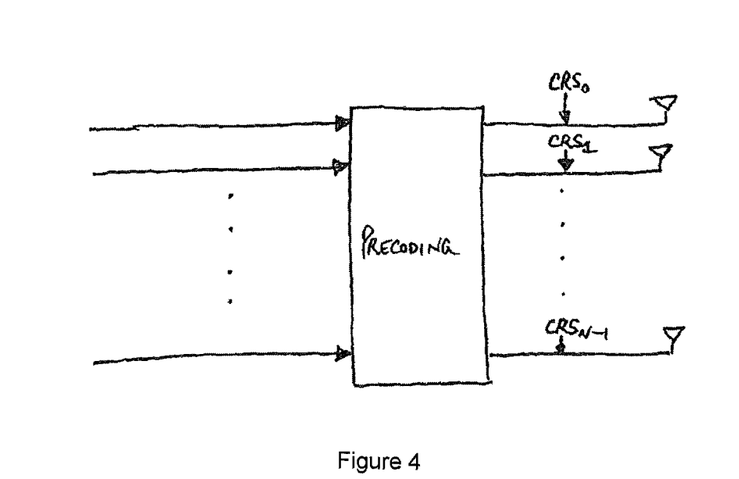
FIG. 4 illustrates an example of a transmission technique for transmitting downlink control information.

The first transmission technique is illustrated in FIG. 4 and is a codebook-based transmission scheme that involves transmitting the baseband signal defining the DCI message together with cell-specific reference signals (CRS), as described at Section 6.10.1 of 3GPP TS 36.211 V10.4.0. Precoding at eNB 2 and deprecoding at UE 8 is carried out using a precoding matrix (one of a plurality of predefined different matrices whose collection is referred to as a codebook), whose identity is communicated by eNB 2 to UE 8.

Figure 5:
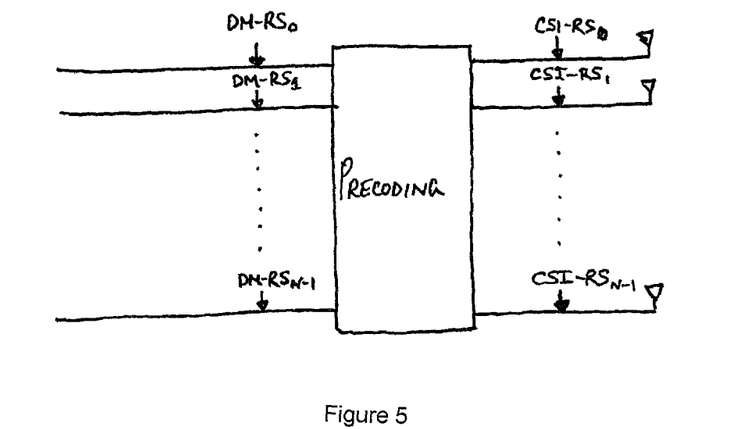
FIG. 5 illustrates an example of another transmission technique for transmitting downlink control information.

The second transmission technique is illustrated in FIG. 5 and involves subjecting UE-specific reference signals (DM-RS) (as described at Section 6.10.3 of 3GPP TS 36.211) to the same precoding as the complex-valued modulation symbols derived from the DCI bits; and transmitting the baseband signal derived from the DCI message together with CSI reference signals (CSI-RS) (as described at Section 6.10.5 of 3GPP TS 36.211) and the precoded UE-specific reference signals. This non-codebook-based transmission technique does not use predefined precoding matrices for the precoding and deprecoding. eNB 2 freely selects downlink transmission weights for each antenna of the antenna array without being restricted to one of a limited predefined number of combinations. UE 8 makes an estimate of the overall channel between eNB 2 and UE 8 using the UE-specific reference signals that are precoded in the same way as the set of complex-valued modulation symbols derived from the DCI message. PDCCHs transmitted according to this enhanced transmission technique are known as enhanced PDCCHs (ePDCCHS).

UE 8 is not aware of exactly which sets of radio resources (control channel elements (CCEs) in a sub-frame) carry the baseband signal defining the DCI message(s) for UE 8. In order to find PDCCH(s) intended for UE 8, UE 8 performs blind decoding by repeatedly selecting different sets of radio resources (that it knows are used for PDCCHs/ePDCCHs) as PDCCH/ePDCCH candidates, and attempting to successfully decode the respective baseband signals. The attempts at decoding involve demasking the CRC using the Cell-RNTI assigned to UE 8. If no CRC error is detected, the decoding attempt is deemed to be successful, and UE 8 reads the control information defined by the decoded bits.

Because the decoding attempts involve setting the size of the DCI message as an input (which size depends on the DCI Format), UE 8 may need to subject each PDCCH/ePDCCH candidate to a separate decoding attempt for each of the two DCI formats that are specified for UE 8 according to the transmission mode of UE 8 and whether or not the PDCCH/ePDCCH for UE 8 is included in the common search space (CSS) or the UE-specific search space (USS).

One example of possible aggregation levels for a DCI message is shown in Table 1 below for both PDCCH and ePDCCH. Table 1 also shows the search space size for each aggregation level. The search space size indicates the size of the set of radio resources (expressed in terms of the number of CCEs) in which the PDCCH or e-PDCCH of the respective aggregation level could be found. The search spaces for each aggregation level are predefined sets of radio resources (CCEs) whose identity is pre-stored at UE 8. The maximum number of PDCCH/ePDCCH candidates that UE 8 would need to check in order to find a PDCCH/ePDCCH of a certain type (i.e. either PDCCH or ePDCCH) and aggregation level is given by the respective search space size divided by the respective aggregation level. If the DCI message can have one of two DCI formats, UE 8 may need to make up to two decoding attempts for each PDCCH/ePDCCH candidate, because of the different sizes of the different DCI formats.

| Type | Search space $S_k^{(L)}$ of PDCCH | | Number of PDCCH candidates $M^{(L)}$ | Search space $S_k^{(L)}$ of ePDCCH | | Number of ePDCCH candidates $M^{(L)}$ |
|---|---|---|---|---|---|---|
| | Aggregation level L | Size [in CCEs] | | Aggregation level L | Size [in eCCEs] | |
| UE-specific | 1 | 6 | A | 1 | 6 | U |
| | 2 | 12 | B | 2 | 12 | V |
| | 4 | 8 | C | 4 | 8 | W |
| | 8 | 16 | D | 8 | 16 | X |
| Common | 4 | 16 | E | 4 | 16 | Y |
| | 8 | 16 | F | 8 | 16 | Z |

If no restrictions were set by eNB 2 on what aggregation level are used for DCI messages for UE 8, the maximum number of PDCCH/ePDCCH candidates that UE 8 would have to make decoding attempts for would be forty-four (44).

According to this first embodiment of the present invention: in order to assist UE 8 in finding the baseband signals for the DCI message(s) for UE 8 in a sub-frame (and thereby reduce the processing power required at UE 8 for blind decoding), eNB 2 sets restrictions on which aggregation levels (PDCCH formats) it uses for DCI messages for UE 8, and transmits an indication of the restrictions to UE 8 by higher layer signalling such as RRC signalling or MAC-CE signalling, in advance of the PDCCH transmissions to which the restrictions apply.

Figure 6:
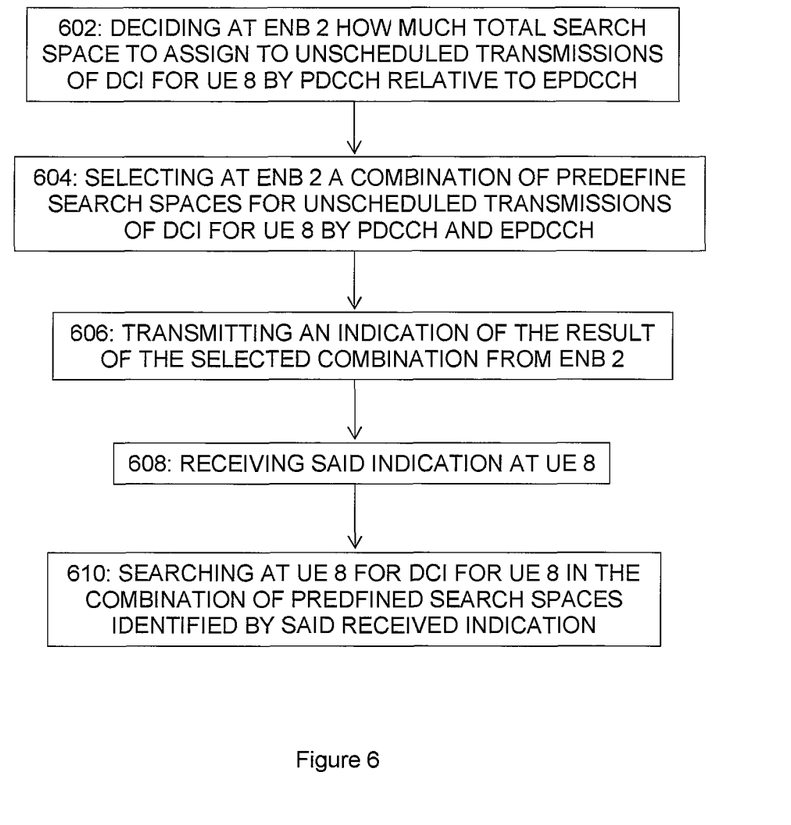
FIG. 6 illustrates an example of operations at a network access node and user equipment of FIG. 1 in accordance with a first embodiment of the present invention.

With reference to FIG. 6, eNB 2 decides how much total search space to assign to DCI by PDCCH relative to ePDCCH (STEP 602), and selects a combination of predefined search spaces for transmission of DCI by PDCCH and ePDCCH (STEP 604). eNB 2 then transmits to UE 8 a message identifying the selected combination of search spaces (STEP 606). UE 8 receives this transmitted message (STEP 608), and restricts the searching it performs as part of blind decoding to the selected combination of search spaces identified in the message received from eNB 2 (STEP 610).

According to one example: subject to any limitations resulting from the blind decoding capability of UE 8 (i.e. the maximum number of decoding attempts that UE can make in a sub-frame), eNB freely sets each of A to F and U to Z of Table 1 to zero or the maximum number of candidates according to whether or not the respective combination of PDCCH/ePDCCH type and aggregation level is to be used for UE 8; and information of the chosen settings is communicated to UE 8. For example, eNB 2 could set each of A to F and U to Z such that the maximum total number of PDCCH/ePDCCH candidates is 22, which is the maximum total number of PDCCH candidates under the conventional procedure (using only PDCCH and not ePDCCH) described at Section 9.1.1 of 3GPP TS 36.213. This communication to UE 8 of values for A to F and U to Z can be done by separated encoding or joint encoding.

One combination of A to F and U to Z can be chosen as a default combination whose selection does not need to be communicated to UE 8, because UE 8 is preconfigured to adopt this default configuration in the absence of any transmitted indication about the selection of a combination of A to F and U to Z for UE 8. One example of a default combination is: A=6; B=6; C=2; D=2; E=4; F=2 and all of U to Z=0. According to this default combination, no unscheduled transmissions of DCI are made via ePDCCH, only via PDCCH.

According to another example aimed at reducing the overhead for the communication to UE 8, eNB 2 selects for UE 8 one of a plurality of predefined configurations, and communicates the identity of the selected predefined configuration to UE 8 by means of a policy number recognisable to UE 8 as associated with a combination of values for A to F and U to Z pre-stored at UE 8.

For example, the plurality of predefined configurations could be formulated such that there are predefined configurations with different amounts of resources allocated to PDCCH and ePDCCH for UE 8. Examples include: (i) a configuration in which A to F are each set to the maximum number of candidates and U to Z are each set to zero (i.e. a maximum amount of resources is allocated to PDCCH for UE 8 and no resources are allocated to ePDCCH for UE 8); (ii) a configuration in which the sum of A to F is 14 and the sum of U to Z is 8 (i.e. about twice as many resources are allocated to PDCCH for UE 8 as to ePDCCH for UE 8); (iii) a configuration in which the sum of A to F is 8 and the sum of U to Z is 14 (i.e. about twice as many resources are allocated to ePDCCH for UE 8 as to PDCCH for UE 8); and (iv) a configuration in which A to F are all set to zero and U to Z are each set to the maximum number of candidates (i.e. a maximum amount of resources is allocated to ePDCCH for UE 8 and no resources are allocated to PDCCH for UE 8).

The above-described technique provides a way to tradeoff gain and load between PDCCH and ePDCCH. Allocating more resources to PDCCH and less to ePDCCH can help to reduce the conflicting ratio. On the other hand, allocating more resources to ePDCCH and less to PDCCH can increase the FDPS gain, user selective gain etc. eNB 2 decides on an optimum allocation of resources between PDCCH and ePDCCH for UE 8 based on a number of factors such as load and the state of the channel between eNB 2 and UE 8.

According to a second embodiment: the amount of processing power required for blind decoding at UE 8 is reduced by eNB 2 placing further restrictions on the DCI formats that it uses for DCI messages to UE 8 at one or more aggregation levels via PDCCH and/or ePDCCH; and communicating the restrictions to UE 8 by higher layer signalling such as RRC signalling or MAC-CE signalling. For example, by restricting DCI messages including PDSCH scheduling information for UE 8 at one or more aggregation levels to only one DCI Format instead of two DCI formats, and communicating this restriction from eNB 2 to UE 8, the processing power required at UE 8 for blind decoding can be reduced. For example, where DCI Format 2 is used to provide control information required for a scheduled transmission according to a preferred transmission mode, and DCI Format 1 is used to provide control information required for the same scheduled transmission according to a fall-back transmission mode (which is more reliable than said preferred mode in some situations such as when the UE is relatively distant from eNB 2); then eNB 2 can decide to reduce the number of aggregation levels at which it sends DCI messages according to DCI Format 2 if it determines that the probability of the preferred transmission mode resulting in a successful transmission falls below a threshold value.

Figure 7:
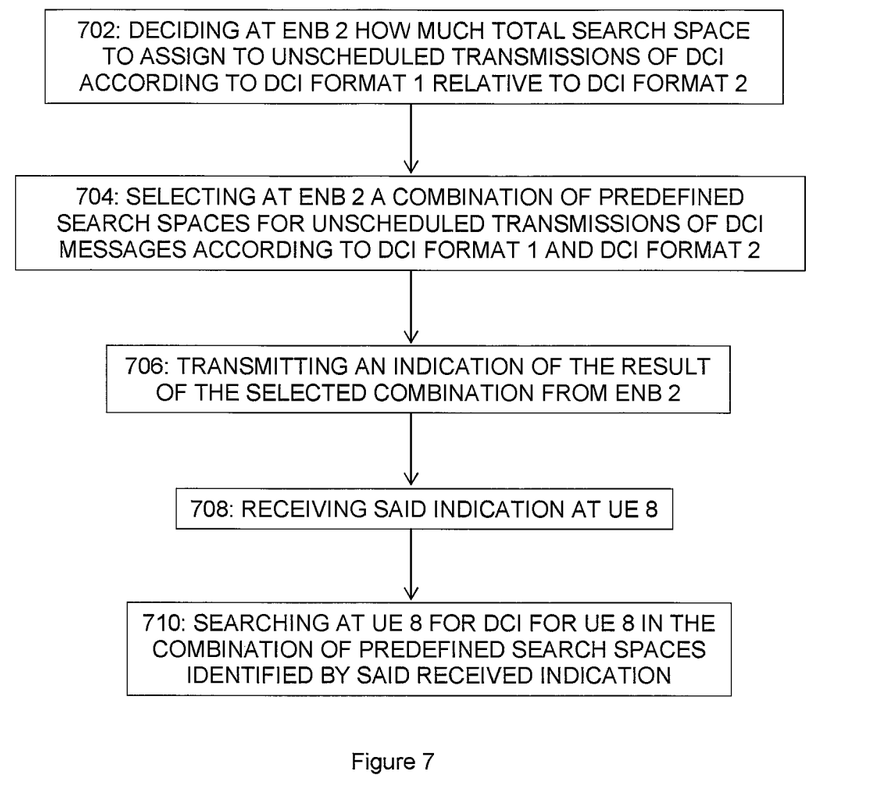
FIG. 7 illustrates an example of operations at a network access node and user equipment of FIG. 1 in accordance with a second embodiment of the present invention.

With reference to FIG. 7, eNB 2 decides how much total search space to assign to DCI Format 1 relative to DCI Format 2 (STEP 702), and selects a combination of predefined search spaces for DCI Formats 1 and 2 (STEP 704). eNB 2 then transmits to UE 8 a message identifying the selected combination of search spaces (STEP 706). UE 8 receives this transmitted message (STEP 708), and restricts the searching it performs as part of blind decoding to the selected combination of search spaces identified in the message received from eNB 2 (STEP 710).

According to a third embodiment, the technique according to the second embodiment is used in combination with the technique according to the first embodiment.

The above-described operations may require data processing in the various entities. The data processing may be provided by means of one or more data processors. Similarly various entities described in the above embodiments may be implemented within a single or a plurality of data processing entities and/or data processors. Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

For example the embodiments of the invention may be implemented as a chip set, in other words a series of integrated circuits communicating among each other. The chipset may comprise microprocessors arranged to run code, application specific integrated circuits (ASICs), or programmable digital signal processors for performing the operations described above.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described embodiment may be made within the scope of the invention.

What is claimed is:

1. A method, comprising:
   selecting, in a system in which a communication device searches for transmissions of downlink control information for said communication device, a combination of search spaces for the transmissions by a plurality of transmission techniques of downlink control information for the communication device, wherein the combination defines search spaces for the plurality of transmission techniques, wherein the selecting comprises selecting a respective set of one or more aggregation levels for each transmission technique of said plurality of transmission techniques, and wherein a plurality of aggregation levels are available for the transmission of downlink control information and a respective search space is predefined for each aggregation level of each transmission technique; and
   transmitting an indication of the selection identifying the selected set of one or more aggregation levels to said communication device.

2. A method according to claim 1, comprising deciding how much search space to assign to transmissions of downlink control information for said communication device by one or more of said plurality of transmission techniques relative to transmissions of downlink control information for said communication device by one or more others of said plurality of transmission techniques.

3. A method according to claim 1, wherein said selecting comprises selecting a predefined combination from a plurality of predefined combinations.

4. A method according to claim 1, wherein said selecting is performed at least partly on the basis of one or more of: (a) a size of a load on a cell in which the transmissions are made, and (b) channel state information for a wireless interface with the communication device.

5. A method according to claim 1, wherein said plurality of transmission techniques comprise: a first transmission technique involving the transmission of one or more reference signals specific to said communication device; and a second transmission technique that does not involve transmission of one or more reference signals specific to said communication device.

6. A method according to claim 1, wherein said plurality of transmission techniques comprise: a first transmission technique involving the transmission of both one or more reference signals specific to said communication device and one or more channel-state-information reference signals; and a second transmission technique involving transmission of one or more cell-specific reference signals.

7. A method according to claim 1, wherein said plurality of transmission techniques comprise: a first transmission technique involving the precoding and transmission of demodulation reference signals together with the precoding and transmission of data symbols defining downlink control information, and the transmission of one or more channel state information reference signals together with the transmission of precoded data symbols defining downlink control information; and a second transmission technique that involves transmission of cell-specific reference signals together with transmission of precoded data symbols defining downlink control information.

8. An apparatus comprising:
a processor and memory including computer program code, wherein the memory and computer program code are configured to, with the processor, cause the apparatus to:
select, in a system in which a communication device searches for transmissions of downlink control information for said communication device, a combination of search spaces far the transmissions by a plurality of transmission techniques of the downlink control information for the communication device, wherein the combination defines search spaces for the plurality of transmission techniques, wherein the selecting comprises selecting a respective set of one or more aggregation levels for each transmission technique of said plurality of transmission techniques, and wherein a plurality of aggregation levels are available for the transmission of downlink control information and a respective search space is predefined for each aggregation level of each transmission technique; and
transmit an indication of the selection identifying the selected set of one or more aggregation levels to said communication device.

9. An apparatus according to claim 8, wherein the memory and computer program code are further configured to, with the processor, cause the apparatus to: decide how much search space to assign to transmissions of downlink control information for said communication device by one or more of said plurality of transmission techniques relative to transmissions of downlink control information for said communication device by one or more others of said plurality of transmission techniques.

10. An apparatus according to claim 8, wherein the memory and computer program code are further configured to, with the processor, cause the apparatus to: select a predefined combination from a plurality of predefined combinations.

11. An apparatus according to claim 8, wherein the memory and computer program code are further configured to, with the processor, cause the apparatus to:
perform said selection at least partly on the basis of one or more of (a) a size of a load on a cell in which the transmissions are made, and (b) channel state information for a wireless interface with the communication device.

12. An apparatus according to claim 8, wherein said plurality of transmission techniques comprise: a first transmission technique involving the transmission of one or more reference signals specific to said communication device; and a second transmission technique that does not involve transmission of one or more reference signals specific to said communication device.

13. An apparatus according to claim 8, wherein said plurality of transmission techniques comprise: a first transmission technique involving the transmission of both one or more reference signals specific to said communication device and one or more channel-state-information reference signals; and a second transmission technique involving transmission of one or more cell-specific reference signals.

14. A method, comprising:
receiving, at a communication device, indication of a result of a selection of a combination of search spaces for transmissions by a plurality of transmission techniques of downlink control information for said communication device, wherein the combination defines search spaces for the plurality of transmission techniques, wherein the selection comprises selection of a respective set of one or more aggregation levels for each transmission technique of said plurality of transmission techniques, and wherein a plurality of aggregation levels are available for the transmission of downlink control information and a respective search space is predefined for each aggregation level of each transmission technique; and
searching, at the communication device, for the transmissions of the downlink control information for said communication device, wherein said searching is performed on the basis of the received indication.

15. An apparatus comprising:
a processor and memory including computer program code, wherein the memory and computer program code are configured to, with the processor, cause the apparatus to:
receive, at a communication device, indication of a result of a selection of a combination of search spaces for transmissions by a plurality of transmission techniques of downlink control information for said communication device, wherein the combination defines search spaces for the plurality of transmission techniques, wherein the selection comprises selection of a respective set of one or more aggregation levels for each transmission technique of said plurality of transmission techniques, and wherein a plurality of aggregation levels are available for the transmission of downlink control information and a respective search space is predefined for each aggregation level of each transmission technique; and
search, at the communication device, for the transmissions of the downlink control information for said communication device, wherein said searching is performed on the basis of the received indication.

16. A method according to claim 15, wherein said plurality of transmission techniques comprise: a first transmission technique involving the transmission of one or more reference signals specific to said communication device; and a second transmission technique that does not involve transmission of one or more reference signals specific to said communication device.

17. A method according to claim 15, wherein said plurality of transmission techniques comprise: a first transmission technique involving the transmission of both one or more reference signals specific to said communication device and one or more channel-state-information reference signals; and a second transmission technique involving transmission of one or more cell-specific reference signals.

18. A method according to claim 14, further comprising reading downlink control information found in response to the searching.

* * * * *

UNITED STATES PATENT AND TRADEMARK OFFICE
CERTIFICATE OF CORRECTION

PATENT NO.        : 9,635,662 B2
APPLICATION NO.   : 14/598362
DATED             : April 25, 2017
INVENTOR(S)       : Xiao Yi Wang and Frank Frederiksen Page 1 of 1

It is certified that error appears in the above-identified patent and that said Letters Patent is hereby corrected as shown below:

In the Claims

In Claim 8:

Column 15, Line 15, "far" should be deleted and --for-- should be inserted.

Signed and Sealed this
Thirtieth Day of May, 2017

Michelle K. Lee
*Director of the United States Patent and Trademark Office*